W. A. V. PORTER.
COMBINED PACKING AND DISPLAY CARTON.
APPLICATION FILED OCT. 10, 1911.
1,018,726.
Patented Feb. 27, 1912.
2 SHEETS—SHEET 1.
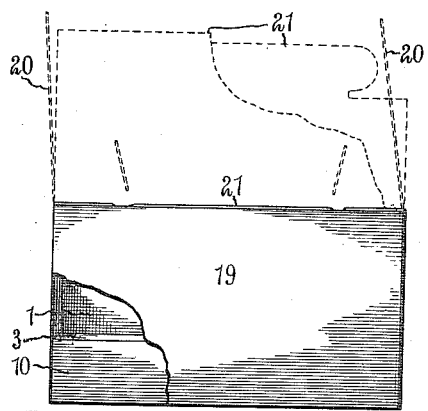
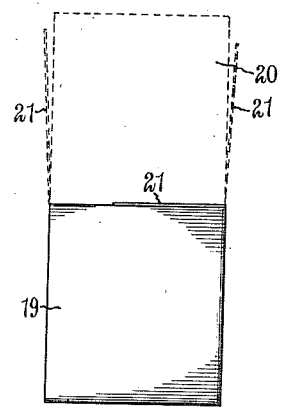
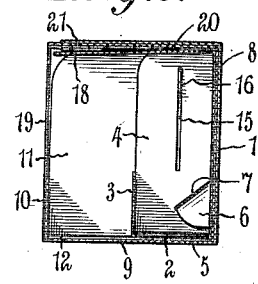
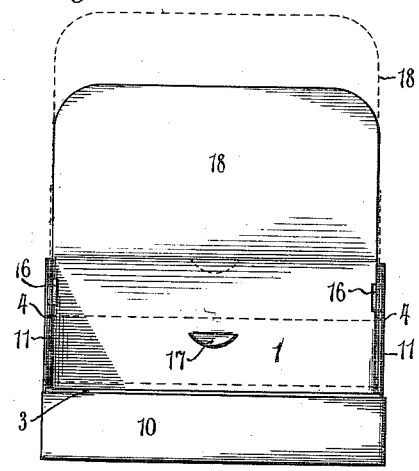
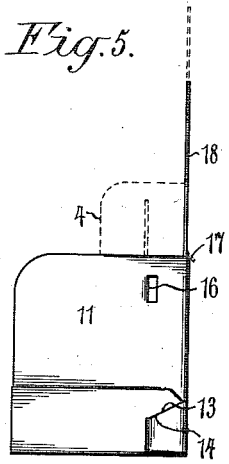
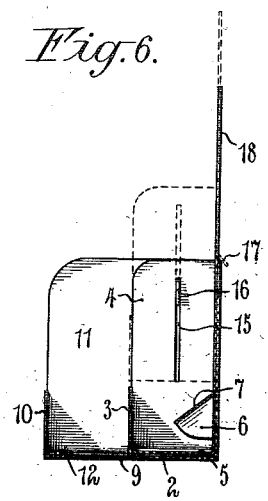
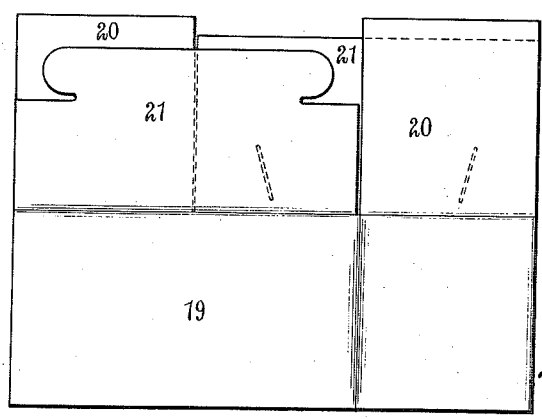
Witnesses:
Inventor:

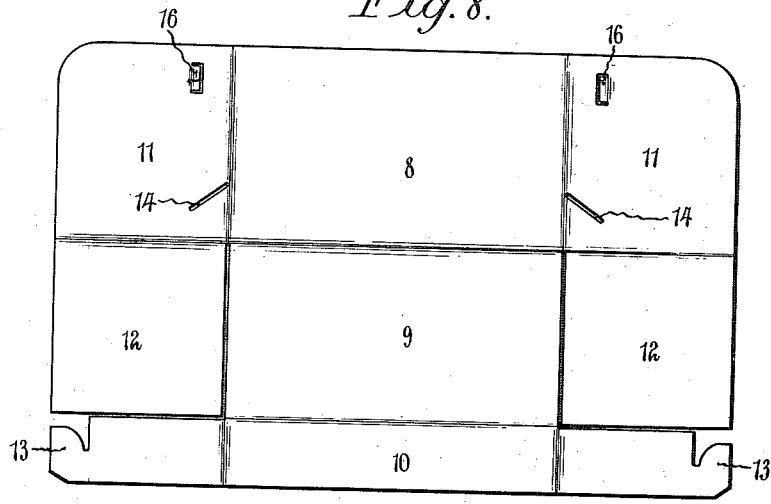
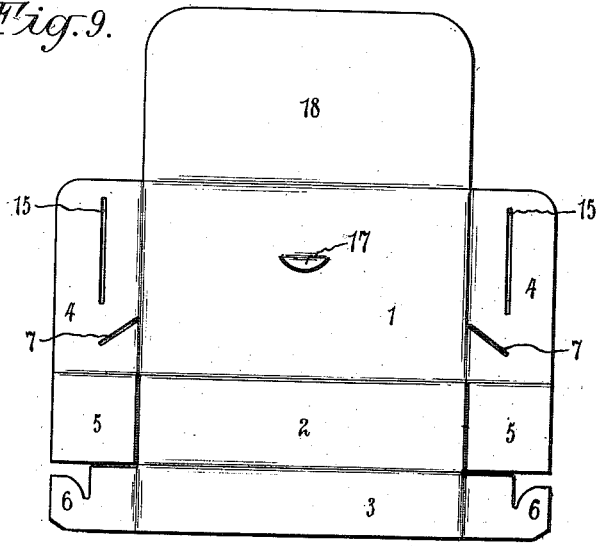
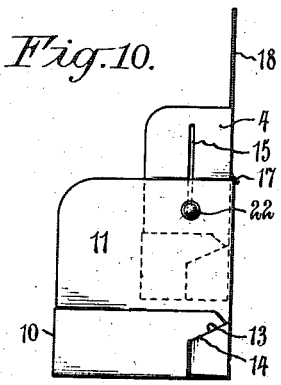

//UNITED STATES PATENT OFFICE.

WILLIAM A. V. PORTER, OF NEW YORK, N. Y.

COMBINED PACKING AND DISPLAY CARTON.

1,018,726.   Specification of Letters Patent.   Patented Feb. 27, 1912.

Application filed October 10, 1911. Serial No. 653,873.

*To all whom it may concern:*

Be it known that I, WILLIAM A. V. PORTER, a citizen of the United States, and resident of the borough of Manhattan, in the city and State of New York, have invented a new and useful Combined Packing and Display Carton, of which the following is a specification.

This invention relates to a combined packing and display carton with the object in view of providing an article of this character which will form a firm and substantial protective covering for frangible articles when shipped, while, at the same time, being adaptable for ready conversion into a display arrangement for holding the articles contained therein in stepped association, whereby the articles in the rear will be clearly displayed over the articles in front.

Another object is to provide an article of this character which is extremely light and cheap to manufacture.

A further object is to provide certain improvements in the form, construction and arrangement of the several parts whereby the above-mentioned objects may be effectively carried out.

In general, the invention comprises a pair of receptacles for holding two rows of articles, the receptacles being arranged to hold the articles in the same plane for shipment, and to hold the articles in the rear row in a plane above the plane of those in the front row for display purposes; these two receptacles being combined for shipment with an outer casing of suitable form and structure.

Practical embodiments of my invention are represented in the accompanying drawings, in which—

Figure 1 represents a front view of the complete article, parts being broken away to show the interior, and the top of the case being shown in open position in dotted lines. Fig. 2 represents an end view of the parts shown in Fig. 1. Fig. 3 represents a transverse section showing the entire article in its completely folded position for shipment. Fig. 4 represents a front view of the two receptacles, the inner one being shown in lowered position in full lines and in raised position in dotted lines. Fig. 5 represents an end view of the parts shown in Fig. 4. Fig. 6 represents a transverse section of the same. Fig. 7 represents a perspective view of the casing in its unfolded position. Fig. 8 represents the stamped blank adapted to be folded to form the outer receptacle. Fig. 9 represents the stamped blank adapted to be folded to form the inner receptacle, and Fig. 10 represents an end view of a modified form showing the inner receptacle in its raised position with respect to the outer receptacle.

The inner receptacle is denoted in general by 1 and may be conveniently composed of cardboard or other suitable material stamped from a blank. The blank may be stamped and creased in a well known manner so as to adapt it for folding into the appropriate shape contemplated by this invention. To this end the blank will be provided with a bottom panel 2, a low front panel 3, and end panels 4 as well as flaps 5, adjacent to the ends of the panel 2, and hook flaps 6 on the panel 3. The flaps 5 are arranged to be folded within the receptacle while the hook flaps 6 are fitted to engage slits 7 for holding the receptacle in its folded position.

The outer receptacle is denoted in general by 8 and may be stamped from cardboard or other similar material in a manner exactly similar to that referred to in relation to the inner receptacle 1. The outer receptacle 8 is also provided with a bottom panel 9, a low front panel 10, end panels 11, flaps 12, hook flaps 13 and slits 14, all for exactly the same purpose as the corresponding parts of the inner receptacle 1.

It will be noted that the bottom panel 2 of the inner receptacle is about half the width of the bottom panel 9 of the outer receptacle, so that when in their folded positions the inner receptacle 1 is only about half as deep as the outer receptacle 8. This is clearly shown in Fig. 6 of the drawings.

The inner and outer receptacles when folded are of substantially the same width and height, but the inner receptacle is made just a fraction less in width than the outer receptacle in order that the former may fit conveniently within the latter.

As stated above, the invention contemplates that the inner receptacle 1 shall be vertically adjustable within the outer receptacle 8, and the following means are provided to effect this result: The end panels 4 of the inner receptacle 1 are provided with vertically disposed slots 15 fitted to receive tongues 16 stamped from the end panels 11 of the outer receptacle 8, this engagement being clearly shown in Figs. 3, 4 and 6 of the drawings. The inner receptacle 1 is also provided in its back with a downwardly extending ear 17, struck therefrom, fitted to engage or hook over the upper edge of the back of the outer receptacle 8 when the inner receptacle is in its raised position, as clearly shown in dotted lines in Figs. 5 and 6. The inner receptacle 1 is further provided with a protective top panel 18 adapted to be folded over—for protecting the upper part of the contents of the receptacle, this panel being shown in its folded position in Fig. 3.

The outer casing, which is for the purpose of protecting the receptacles and contents thereof during shipment, is denoted by 19 and may be conveniently composed of cardboard or other similar material stamped, folded and secured into an appropriate shape, such, for instance, as a rectangle; and may be provided with suitable flaps 20 and 21 arranged to be folded so as to close the top of the casing, the bottom being left open.

In operation, when it is desired to ship, for instance a dozen bottles of some commodity; the inner and outer receptacles after being folded in the form described may be placed the former within the latter with the tongue 16 engaging the slots 15 as shown in full lines in Figs. 4 and 6. The bottles may then be placed, six in the inner receptacle and six in front of the others, in the outer receptacle. The protective top panel 18 of the inner receptacle 1 may then be folded down so as to lie in a horizontal plane. The casing 19 may have its flaps 20 and 21 folded down so as to close the top and then be placed down over both the inner and outer receptacles, thus forming a completely inclosed, shipable package; the bottom of the outer receptacle 8 forming the bottom of the package as a whole while the casing 19 forms, together with certain parts of the inner and outer receptacles 1 and 8, the sides, ends and top of the shipping assembly as a whole. After the consignee has received the goods, the casing 19 may be removed, the panel 18 of the inner receptacle 1 raised to a vertical position, as shown in full lines in Figs. 4, 5 and 6, and then the inner receptacle as a whole lifted vertically, the tongues 16 sliding in the slots 15 for guiding the vertical movement, until the ear 17 is above the upper edge of the back of the outer receptacle 8. The inner receptacle may then be lowered slightly so as to cause the said ear to engage the back of the outer receptacle and hold the inner receptacle in its raised position within the latter as clearly shown in dotted lines in Figs. 4, 5 and 6. While in this position, the half-dozen bottles composing the rear row and contained within the inner receptacle, will be displayed in artistic manner above the front row of bottles. Both the inner and outer receptacles having low front portions permit any artistic labels which the bottles may bear to be attractively exposed to customers.

The modified form shown in Fig. 10, is identically the same as that already described and illustrated in the other figures except that the outer receptacle, instead of being provided with tongues 16 struck therefrom, is provided with a pair of rivets 22 for engaging the slots 15. This form operates in exactly the same manner as that previously described.

It will be seen that my invention provides a very cheap and effective combined packing and display carton which will adequately protect the articles during transit, as well as affording the retailer a simple and ready means of displaying the goods in his store.

Any parts of the various members of the article as a whole may be appropriately decorated or stamped with advertising matter, the panel 18 of the inner receptacle 1 lending itself particularly to such use.

It may be understood that various changes might be resorted to in the form, construction and arrangement of the several parts without departing from the spirit and scope of my invention; hence I do not wish to limit myself strictly to the structure herein set forth, but

What I claim is:—

1. An article of the character described comprising a pair of receptacles, the one vertically slidable within the other with the backs of the two in engagement, one of said receptacles being deeper than the other and both being normally open at the front, the said receptacles being fitted to carry articles of merchandise and the deeper one being provided with a device for preventing the contents from falling forward, and means for holding the slidable one in its raised position within the other, whereby the contents of the slidable one may be displayed over the contents of the other.

2. An article of the character described comprising a pair of receptacles, the one vertically slidable within the other with the backs of the two in engagement, one of said receptacles being deeper than the other and both being normally open at the top and front, the said receptacles being fitted to carry articles of merchandise and the deeper one being provided with a device for preventing the contents from falling forward, means for holding the slidable one in its raised position within the other, whereby the contents of the slidable one may be displayed over the contents of the other, and one of the receptacles being provided with means for closing the top of both when the slidable one is in its lowered position.

3. An article of the character described comprising a pair of receptacles, the one vertically slidable within the other with the backs of the two in engagement, one of said receptacles being deeper than the other and both being normally open at the front, the said receptacles being fitted to carry articles of merchandise and the deeper one being provided with a device for preventing the contents from falling forward, means for holding the slidable one in its raised position within the other, whereby the contents of the slidable one may be displayed over the contents of the other, and a protective casing open at the bottom and arranged to be closed at the top, said casing being fitted to cover the top, sides and ends of the said receptacle for forming a packing and shipping assembly.

4. An article of the character described comprising a pair of receptacles stamped from a pair of blanks, one of said receptacles being of less depth than the other and being vertically slidable within the other with the backs of the two in engagement, both of said receptacles being normally open at the top and front and provided with devices for preventing the contents from falling forward, each of said receptacles being adapted to carry a row of articles of commerce, means for holding the slidable one in its raised position for displaying its articles above those in the other receptacle, and a protective casing stamped from a blank and fitted to cover the top, sides and ends of the receptacles when the slidable one is in its lowered position for forming a packing and shipping assembly.

In testimony, that I claim the foregoing as my invention, I have signed my name in presence of two witnesses, this ninth day of October 1911.

WILLIAM A. V. PORTER.

Witnesses:
F. GEORGE BARRY,
HENRY C. THIEME.